UNITED STATES PATENT OFFICE.

ALEXANDER CLASSEN, OF AACHEN, GERMANY.

PROCESS OF CONVERTING WOOD INTO SUGAR.

SPECIFICATION forming part of Letters Patent No. 707,903, dated August 26, 1902.

Application filed July 30, 1901. Serial No. 70,293. (Specimens.)

*To all whom it may concern:*

Be it known that I, ALEXANDER CLASSEN, a citizen of Germany, residing at Aachen, in the Empire of Germany, have invented certain new and useful Improvements in Processes of Converting Wood and other Cellulose Material into Sugar, of which the following is a specification.

In Patent No. 654,518, granted to me, I have described a process for converting cellulose into sugar, consisting in heating the material with sulfurous acid and sulfuric acid, the latter being either added as such or produced by the introduction of some oxidant, such as air, a peroxid, or a manganate. The operation proceeds best when the oxidant is introduced into the sulfurous acid after the heating has been continued for a certain time, and in order that such oxidant may act satisfactorily there must be sufficient liquid present to diffuse it through the mass. By my present invention I avoid the inconvenience of introducing an oxidizing agent by using only sufficient solution of sulfurous acid to moisten the sawdust which is used as the source of cellulose. The sawdust, which generally contains about twenty-five to thirty per cent of moisture, is mixed with about thirty to thirty-five per cent of its weight of sulfurous-acid solution and is heated in a closed vessel at 120° to 145° centigrade for a period of thirty to sixty minutes. At the end of the period the excess of sulfurous acid is allowed to blow off and the mass is lixiviated with water to produce a sugar solution. The said proportion of sulfurous-acid solution is only sufficient to moisten the sawdust, so that the air mixed with the latter is not displaced by the liquid and is therefore able to effect the oxidation produced in the previous process by the introduction of an oxidant. Moreover, my new process, by avoiding the necessity referred to above for much liquid, enables me to produce a stronger solution.

Having thus fully described my invention, what I claim as new, and desire to secure by Letters Patent, is—

A process of converting cellulose into sugar which consists in mixing one hundred parts by weight of the moist material with thirty to thirty-five parts of an aqueous solution of sulfurous acid, heating the mixture in a closed vessel at 120° to 145° centigrade for thirty to sixty minutes, blowing off the free sulfurous acid and finally lixiviating the mass with water, substantially as described.

In witness whereof I have hereunto set my hand in presence of two witnesses.

ALEXANDER CLASSEN.

Witnesses:
 E. M. BRUNDAGE,
 H. CRUSIOLFLIEG.